(12) United States Patent
Liu et al.

(10) Patent No.: US 11,494,748 B2
(45) Date of Patent: Nov. 8, 2022

(54) SYSTEM AND METHOD FOR CONSTRUCTING MOBILE ELECTRIC ENERGY INTERCONNECTION, DATA TESTING METHOD AND DEVICE

(71) Applicants: INFORMATION AND COMMNUNICATION BRANCH, STATE GRID JIANGXI ELECTRIC POWER COMPANY, Jiangxi (CN); STATE GRID CORPORATION OF CHINA, Beijing (CN)

(72) Inventors: Xianming Liu, Jiangxi (CN); Chi E, Jiangsu (CN); Ming Cheng, Jiangxi (CN); Hongjie Shen, Jiangxi (CN); Jun Li, Jiangxi (CN); Xin Sun, Jiangsu (CN); Zhenwen Tao, Jiangxi (CN); Hong Jiang, Jiangxi (CN); Bin Li, Jiangxi (CN); Jianxu Wang, Jiangxi (CN); Zilan Zhou, Jiangxi (CN)

(73) Assignees: INFORMATION AND COMMUNICATION BRANCH, STATE GRID JIANGXI ELECTRIC POWER COMPANY, Jiangxi (CN); STATE GRID CORPORATION OF CHINA, Beijing (CN)

( * ) Notice: Subject to any disclaimer, the term of this patent is extended or adjusted under 35 U.S.C. 154(b) by 143 days.

(21) Appl. No.: 16/616,002

(22) PCT Filed: Nov. 30, 2018

(86) PCT No.: PCT/CN2018/118588
§ 371 (c)(1),
(2) Date: Nov. 22, 2019

(87) PCT Pub. No.: WO2019/184417
PCT Pub. Date: Oct. 3, 2019

(65) Prior Publication Data
US 2021/0012302 A1    Jan. 14, 2021

(30) Foreign Application Priority Data

Mar. 27, 2018 (CN) .................. 201810256010.X (51) Int. Cl.
*H02J 7/04* (2006.01)
*G06Q 20/14* (2012.01)
(Continued)

(52) U.S. Cl.
CPC .......... *G06Q 20/145* (2013.01); *H02J 7/0048* (2020.01); *H02J 7/0068* (2013.01); *G06Q 50/06* (2013.01)

(58) Field of Classification Search
CPC ............................. H02J 7/0048; H02J 7/0068
(Continued)

(56) References Cited

U.S. PATENT DOCUMENTS 8,269,641 B2 * 9/2012 Bauman ............... H02J 7/14
320/132
8,359,126 B2 * 1/2013 Tate, Jr. ............... B60L 53/30
700/297
(Continued)

FOREIGN PATENT DOCUMENTS

CN 103298644 A 9/2013
CN 104037943 A 9/2014
(Continued)

OTHER PUBLICATIONS

International Search Report for the International Patent Application No. PCT/CN2018/118588, dated Mar. 11, 2019, 6 pages.
(Continued)

*Primary Examiner* — Ryan Jager
(74) *Attorney, Agent, or Firm* — KDB Firm PLLC (57) ABSTRACT

Provided is a system for constructing mobile electric energy interconnection. The system includes at least one mobile
(Continued)

electric energy exchange device, a mobile electric energy interconnection management platform and at least one stationary electric energy interconnection device. The mobile electric energy interconnection management platform is configured to match the at least one mobile electric energy exchange device with the at least one stationary electric energy interconnection device, and push a matching result to the at least one mobile electric energy exchange device and the at least one stationary electric energy interconnection device. Also provided is a method for constructing mobile electric energy interconnection, a data testing method and device, and a computer readable storage medium.

17 Claims, 4 Drawing Sheets

(51) Int. Cl.
*H02J 7/00* (2006.01)
*G06Q 50/06* (2012.01)

(58) Field of Classification Search
USPC ........................................................ 455/573
See application file for complete search history.

(56) References Cited

U.S. PATENT DOCUMENTS

| | | | | |
|---|---|---|---|---|
| 8,983,875 B2* | 3/2015 | Shelton | ................. | B60L 53/51 |
| | | | | 320/109 |
| 9,283,857 B2* | 3/2016 | Shelton | ................. | B60L 55/00 |
| 9,358,894 B2* | 6/2016 | Shelton | ................. | B60L 53/665 |
| 9,452,684 B2* | 9/2016 | Shelton | ................. | H02J 13/0005 |
| 10,286,792 B2* | 5/2019 | Shelton | ................. | G07F 15/008 |
| 10,682,922 B2* | 6/2020 | Shelton | ................. | B60L 53/665 |
| 11,273,718 B2* | 3/2022 | Vahedi | ................. | H02M 7/219 |
| 2008/0040479 A1 | 2/2008 | Bridge et al. | | |
| 2010/0237985 A1* | 9/2010 | Landau-Holdsworth | ................. | |
| | | | | B60L 53/63 |
| | | | | 709/219 |
| 2012/0109798 A1* | 5/2012 | Shelton | ................. | B60L 55/00 |
| | | | | 705/30 |
| 2012/0306446 A1* | 12/2012 | Suganuma | ............. | B60L 53/63 |
| | | | | 701/119 |
| 2013/0179061 A1* | 7/2013 | Gadh | ................. | B60L 53/30 |
| | | | | 701/1 |
| 2015/0226572 A1* | 8/2015 | North | ................. | B60L 53/60 |
| | | | | 701/400 |
| 2016/0334234 A1* | 11/2016 | Wild | ................. | B60L 53/62 |
| 2019/0023138 A1* | 1/2019 | Takatsuka | .......... | G06Q 30/0631 |
| 2021/0012302 A1* | 1/2021 | Liu | ................. | H02J 7/0068 |
| 2021/0137391 A1* | 5/2021 | Mak | ................. | G16H 50/20 |

FOREIGN PATENT DOCUMENTS

| | | |
|---|---|---|
| CN | 104270272 A | 1/2015 |
| CN | 107204077 A | 9/2017 |
| CN | 108280776 A | 7/2018 |

OTHER PUBLICATIONS

Office Action for the Chinese Application No. 201810256010, dated Apr. 20, 2021, 7 pages.

* cited by examiner

SYSTEM AND METHOD FOR
CONSTRUCTING MOBILE ELECTRIC
ENERGY INTERCONNECTION, DATA
TESTING METHOD AND DEVICE

CROSS-REFERENCE TO RELATED
APPLICATIONS

This is a National Stage Application, filed under 35 U.S.C. 371, of International Patent Application No. PCT/CN2018/118588, filed on Nov. 30, 2018, which claims priority to Chinese patent application No, 201810256010.X filed on Mar. 27, 2018, contents of both of which are incorporated herein by reference in their entireties.

TECHNICAL FIELD

The present disclosure relates to the field of energy interconnection and, for example, to a system and method for constructing mobile electric energy interconnection, a data testing method and device.

BACKGROUND

Energy interconnection is a product of deep integration of energy technology and information communication technology. The energy interconnection provides a more open, clean and sustainable energy utilization pattern. As a conveniently transmitting secondary energy, electric energy has become a very important form of energy in the energy interconnection. With the development of energy storage technology, power electronic technology and location service technology, mobile electric energy storage technology is becoming increasingly mature, and the construction of mobile electric energy interconnection has become an urgent choice for commercialization of energy interconnection.

SUMMARY

The present disclosure provides a system and method for constructing mobile electric energy interconnection, a data testing method and device, so as to achieve integration of physical location, electric energy and information flow, implement effective operation of issue, matching, valuation, charge, etc. for mobile electric energy, and provide a base for an electric energy operation service.

In an embodiment, the present disclosure provides a system for constructing mobile electric energy interconnection. The system includes at least one mobile electric energy exchange device, a mobile electric energy interconnection management platform and at least one stationary electric energy interconnection device.

The at least one mobile electric energy exchange device and the at least one stationary electric energy interconnection device are in communication connection with the mobile electric energy interconnection management platform.

The at least one mobile electric energy exchange device is configured to provide a real time position, a first available output electric energy and a first available input electric energy to the mobile electric energy interconnection management platform.

The at least one stationary electric energy interconnection device is configured to provide a working position, a second available output electric energy and a second available input electric energy to the mobile electric energy interconnection management platform.

The mobile electric energy interconnection management platform is configured to match the at least one mobile electric energy exchange device with the at least one stationary electric energy interconnection device according to the real time position, the first available output electric energy and the first available input electric energy received from the at least one mobile electric energy exchange device and the working position, the second available output electric energy and the second available input electric energy received from the at least one stationary electric energy interconnection device, and push a matching result to the at least one mobile electric energy exchange device and the at least one stationary electric energy interconnection device, to enable the electric energy interconnection between the at least one mobile electric energy exchange device and the at least one stationary electric energy interconnection device.

In an embodiment, the present disclosure provides a method for constructing mobile electric energy interconnection. The method includes steps described below.

A real time position, a first available output electric energy and a first available input electric energy sent by at least one mobile electric energy exchange device are received.

A working position, a second available output electric energy and a second available input electric energy sent by at least one stationary electric energy interconnection device are received.

The at least one mobile electric energy exchange device is matched with the at least one stationary electric energy interconnection device according to the real time position, the first available output electric energy and the first available input electric energy received from the at least one mobile electric energy exchange device and the working position, the second available output electric energy and the second available input electric energy received from the at least one stationary electric energy interconnection device, and a matching result is pushed to the at least one mobile electric energy exchange device and the at least one stationary electric energy interconnection device, to enable the electric energy interconnection between the at least one mobile electric energy exchange device and the at least one stationary electric energy interconnection device.

In an embodiment, the present disclosure provides a data testing method. The data testing method includes steps described below.

Measurement data within a data window of a preset time period is acquired.

A variance of the measurement data is calculated.

The variance is compared with a first preset threshold to obtain a comparison result.

Quality of the measurement data is determined according to the comparison result.

In an embodiment, the present disclosure provides a data testing device. The data testing device includes a data acquisition module, a calculation module, a test module and a result module.

The data acquisition module is configured to acquire measurement data within a data window of a preset time period.

The calculation module is configured to calculate a variance of the measurement data.

The test module is configured to compare the variance with a first preset threshold to obtain a comparison result.

The result module is configured to determine quality of the measurement data according to the comparison result.

In an embodiment, the present disclosure provides a data testing method. The data testing method includes steps described below.

A measurement data download request is received, and measurement data to be downloaded corresponding to the measurement data download request is acquired.

A transmission state of the measurement data to be downloaded is determined according to a type of the measurement data to be downloaded or bandwidth occupancy of a current communication network, and the measurement data to be downloaded is issued according to the transmission state.

In an embodiment, the present disclosure provides a data testing device. The data testing device includes a request reception module and a data transmission module.

The request reception module is configured to receive a measurement data download request, and acquire measurement data to be downloaded corresponding to the measurement data download request.

The data transmission module is configured to determine a transmission state of the measurement data to be downloaded according to a type of the measurement data to be downloaded or bandwidth occupancy of a current communication network, and issue the measurement data to be downloaded according to the transmission state.

In an embodiment, the present disclosure provides a computer readable storage medium. Computer programs are stored in the computer readable storage medium. The computer programs, when executed by a processor, implement the method of any one of the above embodiments.

DETAILED DESCRIPTION

Figure 1:
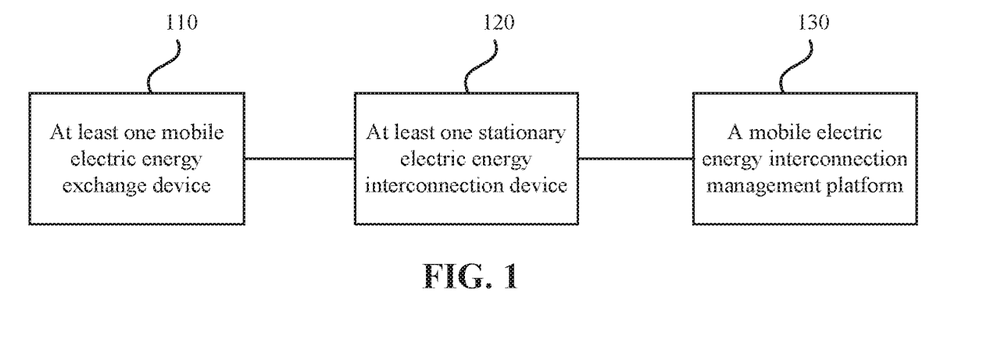
FIG. 1 is a structural diagram of a system for constructing mobile electric energy interconnection provided by an embodiment of the present disclosure.

In an embodiment, the present disclosure provides a system for constructing mobile electric energy interconnection. As shown in FIG. 1, the system includes at least one mobile electric energy exchange device 110, a mobile electric energy interconnection management platform 130 and at least one stationary electric energy interconnection device 120.

The at least one mobile electric energy exchange device 110 and the at least one stationary electric energy interconnection device 120 are in communication connection with the mobile electric energy interconnection management platform 130.

The at least one mobile electric energy exchange device 110 is configured to provide a real time position, a first available output electric energy and a first available input electric energy to the mobile electric energy interconnection management platform.

The at least one stationary electric energy interconnection device 120 is configured to provide a working position, a second available output electric energy and a second available input electric energy to the mobile electric energy interconnection management platform.

The mobile electric energy interconnection management platform 130 is configured to match the at least one mobile electric energy exchange device 110 with the at least one stationary electric energy interconnection device 120 according to the real time position, the first available output electric energy and the first available input electric energy received from the at least one mobile electric energy exchange device 110 and the working position, the second available output electric energy and the second available input electric energy received from the at least one stationary electric energy interconnection device 120, and push a matching result to the at least one mobile electric energy exchange device 110 and the at least one stationary electric energy interconnection device 120, to enable the electric energy interconnection between the at least one mobile electric energy exchange device 110 and the at least one stationary electric energy interconnection device 120.

A software definition of one or more modules of the at least one mobile electric energy exchange device, the mobile electric energy interconnection management platform and the at least one stationary electric energy interconnection device realizes the integration of physical location, electric energy and information flow, and implements software-defined mobile electric energy interconnection.

In an embodiment, the mobile electric energy exchange device includes a first public management module, a first electric energy management module, a mobile position management module, a first communication management module and a first electric energy input/output (I/O) component.

The first public management module is configured to perform a software definition of the first electric energy management module, the mobile position management module and the first communication management module.

The first electric energy management module is configured to manage electric energy of the mobile electric energy exchange device.

The mobile position management module is configured to acquire the real time position of the mobile electric energy exchange device.

The first communication management module is configured to communicate with the mobile electric energy interconnection management platform.

The first electric energy I/O component is configured to input or output electric energy.

In an embodiment, the software definition may be understood as a flexible matching of one or more modules for virtualization according to different application scenarios. The software definition is similar to Software Defined Network in related art.

The first public management module includes the software definition of the first electric energy management module, the mobile position management module and the first communication management module.

In an embodiment, the first electric energy management module includes a first electric energy input sub-module, a first electric energy output sub-module, a first electric energy metering sub-module and a first electric energy billing sub-module.

The first electric energy input sub-module is configured to manage the first available input electric energy of the mobile electric energy exchange device.

The first electric energy output sub-module is configured to manage the first available output electric energy of the mobile electric energy exchange device.

The first electric energy metering sub-module is configured to meter the first available input electric energy and the first available output electric energy.

The first electric energy billing sub-module is configured to provide a billing service to the mobile electric energy exchange device.

In an embodiment, the stationary electric energy interconnection device includes a second public management module, a second electric energy management module, a working position management module, a second communication management module, a second electric energy I/O component and an electric energy conversion component.

The second public management module is configured to perform a software definition of the second electric energy management module, the working position management module and the second communication management module.

The second electric energy management module is configured to manage electric energy of the stationary electric energy interconnection device.

The working position management module is configured to acquire a position of the stationary electric energy interconnection device.

The second communication management module is configured to communicate with the mobile electric energy interconnection management platform.

The second electric energy I/O component is configured to input or output electric energy.

The electric energy conversion component is configured to convert electric energy.

The second electric energy management module includes the software definition of the second electric energy management module, the working position management module and the second communication management module. In an embodiment, the second electric energy management module includes a second electric energy input sub-module, a second electric energy output sub-module, an electric energy conversion sub-module, a second electric energy metering sub-module and a second electric energy billing sub-module.

The second electric energy input sub-module is configured to manage the second available input electric energy of the stationary electric energy interconnection device.

The second electric energy output sub-module is configured to manage the second available output electric energy of the stationary electric energy interconnection device.

The electric energy conversion sub-module is configured to convert electric energy of the stationary electric energy interconnection device according to electric energy of the mobile electric energy exchange device matched with the stationary electric energy interconnection device.

The second electric energy metering sub-module is configured to meter the second available input electric energy and the second available output electric energy.

The second electric energy billing sub-module is configured to provide a billing service to the stationary electric energy interconnection device.

In an embodiment, energy conversion includes at least one of voltage conversion or current conversion.

In an embodiment, the mobile electric energy interconnection management platform includes a third public management module, a mobile electric energy exchange device management module, a stationary electric energy interconnection device management module, a match management module, an expense management module and a third communication management module.

The third public management module is configured to perform a software definition of the mobile electric energy exchange device management module, the stationary electric energy interconnection device management module, the match management module, the expense management module and the third communication management module.

The mobile electric energy exchange device management module is configured to receive the real time position, the first available output electric energy and the first available input electric energy provided by the at least one mobile electric energy exchange device.

The stationary electric energy interconnection device management module is configured to receive the working position, the second available output electric energy and the second available input electric energy provided by the stationary electric energy interconnection device.

The match management module is configured to match the at least one mobile electric energy exchange device with the at least one stationary electric energy interconnection device.

The expense management module is configured to provide a billing service to the at least one mobile electric energy exchange device and the at least one stationary electric energy interconnection device.

The third communication management module is configured to push a matching result to the at least one mobile electric energy exchange device and the at least one stationary electric energy interconnection device.

In an embodiment, the mobile electric energy interconnection management platform may uniformly access mobile electric energy exchange devices and stationary electric energy interconnection devices of different manufacturers. The mobile electric energy interconnection management platform may match at least one mobile electric energy exchange device with at least one stationary electric energy interconnection device, and pushes a matching result to the at least one mobile electric energy exchange device and the at least one stationary electric energy interconnection device.

The third public management module includes the software definition of the mobile electric energy exchange device management module, the stationary electric energy interconnection device management module, the match management module, an expense management module and the communication management module.

The expense management module calculates a price of electric energy according to time, position, and electric quantity. The expense management module provides a billing service to the at least one mobile electric energy exchange device and the at least one stationary electric energy interconnection device.

In an embodiment, the first available output electric energy includes voltage, current, power and frequency of the first available output electric energy.

The first available input electric energy includes voltage, current, power and frequency of the first available input electric energy.

The second available output electric energy includes voltage, current, power and frequency of the second available output electric energy.

The second available input electric energy includes voltage, current, power and frequency of the second available input electric energy.

Figure 2:
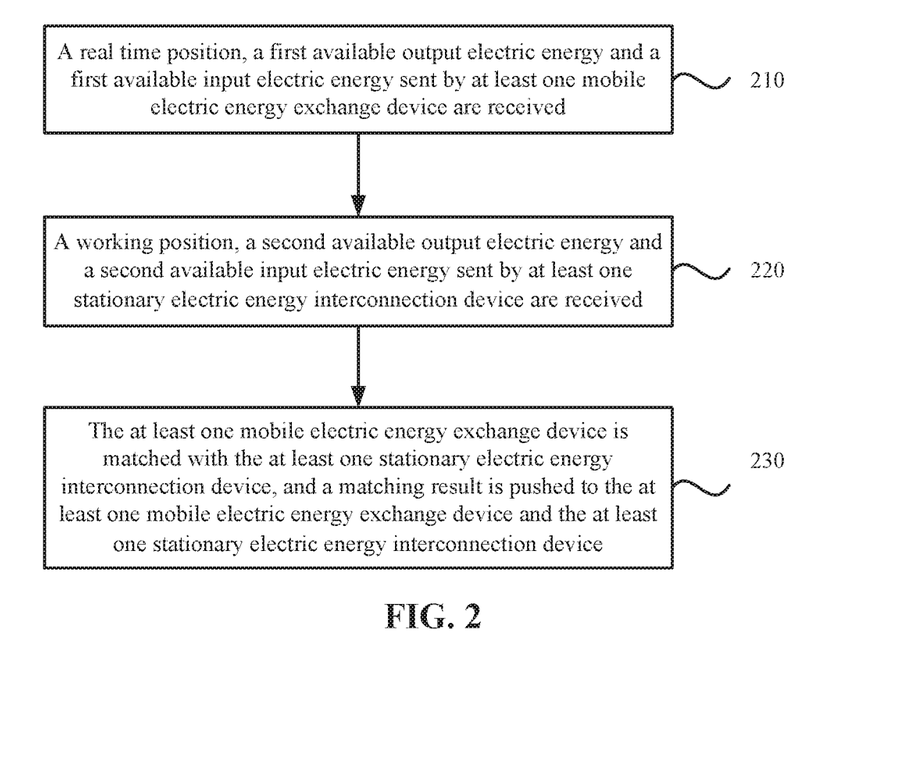
FIG. 2 is a flow diagram of a method for constructing mobile electric energy interconnection provided by an embodiment of the present disclosure.

In an embodiment, the present disclosure provides a method for constructing mobile electric energy interconnection. The method may be applied to a mobile electric energy interconnection management platform. As shown in FIG. 2, the method includes steps described below.

In step S210, a real time position, a first available output electric energy and a first available input electric energy sent by at least one mobile electric energy exchange device are received.

In step S220, a working position, a second available output electric energy and a second available input electric energy sent by at least one stationary electric energy interconnection device are received.

In step S230, the at least one mobile electric energy exchange device is matched with the at least one stationary electric energy interconnection device according to the real time position, the first available output electric energy and the first available input electric energy received from the at least one mobile electric energy exchange device and the working position, the second available output electric energy and the second available input electric energy received from the at least one stationary electric energy interconnection device, and a matching result is pushed to the at least one mobile electric energy exchange device and the at least one stationary electric energy interconnection device, to enable the electric energy interconnection between the at least one mobile electric energy exchange device and the at least one stationary electric energy interconnection device.

In an embodiment, the step in which the at least one mobile electric energy exchange device is matched with the at least one stationary electric energy interconnection device includes steps described below.

Under a condition in which electricity demand of the at least one stationary electric energy interconnection device is satisfied, for each of the at least one stationary electric energy interconnection device, one of the at least one mobile electric energy exchange device getting to the each of the at least one stationary electric energy interconnection device with shortest time is determined according to a road condition, weather and traffic control information.

Under a condition in which electricity demand of the at least one mobile electric energy exchange device is satisfied, for each of the at least one mobile electric energy exchange device, one of the at least one stationary electric energy interconnection device taking shortest time for the each of the at least one mobile electric energy exchange device to get to is determined according to the road condition, the weather and the traffic control information.

The present disclosure unifies physical location, electric energy and information flow into one cyber-physical system. The present disclosure realizes effective operation of issue, matching, valuation, charge, etc. for mobile electric energy, and implements mobile electric energy operation service management. The present disclosure promotes the commercialization and practicability of energy interconnection.

Figure 3:
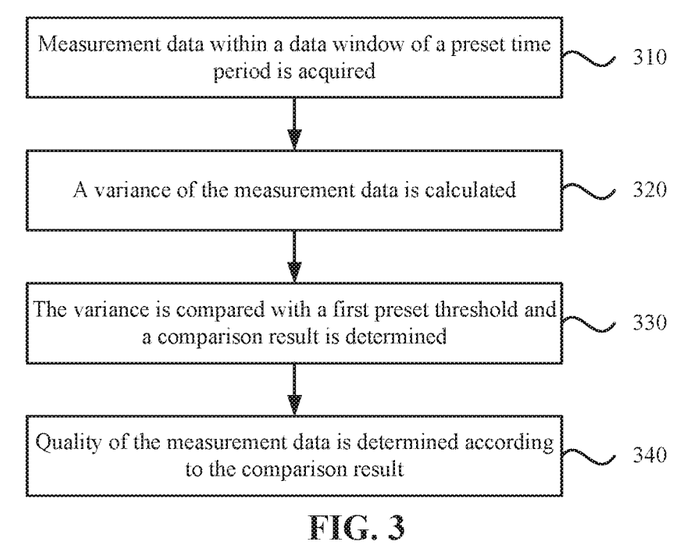
FIG. 3 is a flow diagram of a data testing method provided by an embodiment of the present disclosure.

In an embodiment, the present disclosure provides a data testing method. As shown in FIG. 3, the data testing method includes steps described below.

In step S310, a data acquisition module acquires measurement data within a data window of a preset time period.

In step S320, a variance of the measurement data is calculated.

In step S330, the variance is compared with a first preset threshold to obtain a comparison result.

In step S340, quality of the measurement data is determined according to the comparison result.

In an embodiment, the data testing method is applied to a public management module, such as a first public management module, a second public management module and a third public management module.

In an embodiment, the step in which the measurement data within a data window of a preset time period is acquired includes that a measurement data download request is sent, and the measurement data is acquired within the data window of the preset time period.

In an embodiment, the step in which the quality of the measurement data is determined according to the comparison result includes steps described below.

If the comparison result indicates that the variance is greater than the first preset threshold, the measurement data is determined high quality data.

If the comparison result indicates that the variance is equal to or less than the first preset threshold, the measurement data is determined suspicious data.

In an embodiment, the data testing method also includes steps described below.

The suspicious data is stored into a suspicious database, and correlation between the suspicious data and other data is tested.

If the correlation between the suspicious data and other data is large, the suspicious data is determined high quality data.

If the correlation between the suspicious data and other data is small, the suspicious data is determined low quality data.

In an embodiment, the step in which correlation between the suspicious data and other data is tested includes steps described below.

A correlation coefficient between the suspicious data and other data is calculated.

An absolute value of the correlation coefficient is compared with a second preset threshold.

The step in which correlation between the suspicious data and other data is tested includes steps described below.

If an absolute value of the correlation coefficient is equal to or greater than the second preset threshold, the correlation between the suspicious data and other data is determined to be large.

If an absolute value of the correlation coefficient is less than the second preset threshold, the correlation between the suspicious data and other data is determined to be small.

In an embodiment, the data window includes at least one of:

a first electric energy management module, a mobile position management module and a first communication management module of a mobile electric energy exchange device;

a second electric energy management module, a working position management module and a second communication management module of a stationary electric energy interconnection device; or a mobile electric energy exchange device management module, a stationary electric energy interconnection device management module, a match management module, an expense management module and a third communication management module of a mobile electric energy interconnection management platform.

Figure 4:
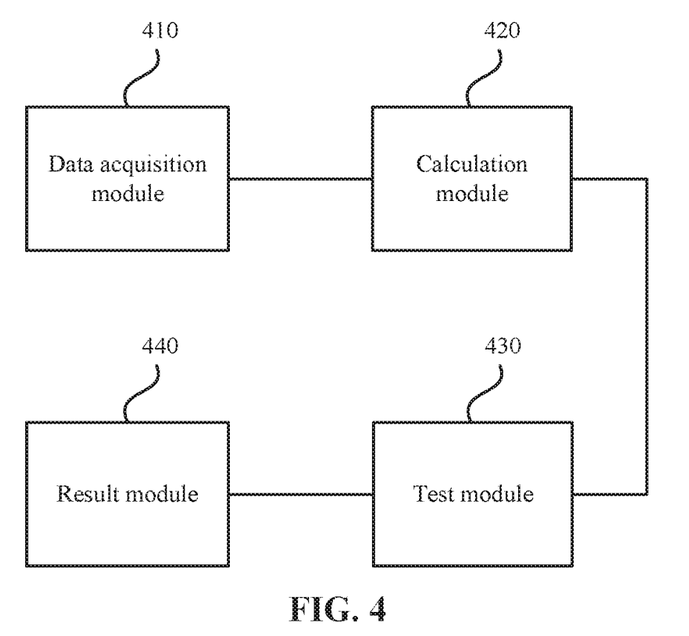
FIG. 4 is a structural diagram of a data testing device provided by an embodiment of the present disclosure.

In an embodiment, the present disclosure provides a date testing device. As shown in FIG. 4, the date testing device includes a data acquisition module 410, a calculation module 420, a test module 430 and a result module 440.

The data acquisition module 410 is configured to acquire measurement data within a data window of a preset time period.

The calculation module 420 is configured to calculate a variance of the measurement data.

The test module 430 is configured to compare the variance with a first preset threshold to obtain a comparison result.

The result module 440 is configured to determine quality of the measurement data according to the comparison result.

Figure 5:
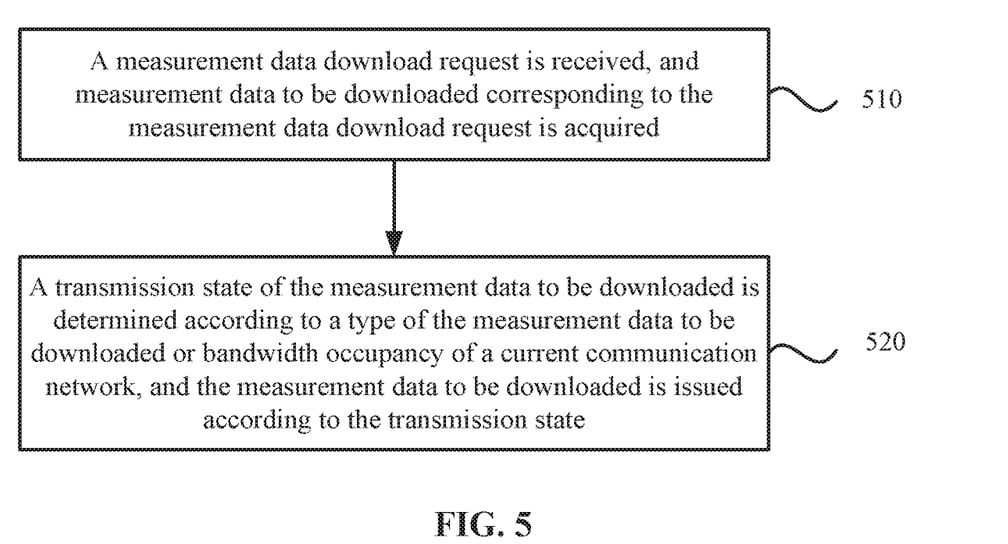
FIG. 5 is another flow diagram of a data testing method provided by an embodiment of the present disclosure.

In an embodiment, the present disclosure provides a date testing method. As shown in FIG. 5, the date testing method includes steps described below.

In step S510, a measurement data download request is received, and measurement data to be downloaded corresponding to the measurement data download request is acquired.

In step S520, a transmission state of the measurement data to be downloaded is determined according to a type of the measurement data to be downloaded or bandwidth occupancy of a current communication network, and the measurement data to be downloaded is issued according to the transmission state.

In an embodiment, the date testing method is applied to a data window side.

In an embodiment, the date testing method also includes steps described below.

The type of the measurement data packet to be downloaded in the measurement data download request is tested.

Bandwidth occupancy of a current communication network is tested.

In an embodiment, the step in which a transmission state of the measurement data to be downloaded is determined according to a type of the measurement data to be downloaded or bandwidth occupancy of a current communication network, and the measurement data to be downloaded is issued according to the transmission state includes steps described below.

If the type of the measurement data to be downloaded is a specific type, the measurement data to be downloaded is issued.

If the type of the measurement data to be downloaded is not a specific type and the bandwidth occupancy of the current communication network is greater than or equal to a first preset value, the measurement data download request is transmitted to a server according to a preset time interval, until the measurement data to be downloaded is issued by the server.

In an embodiment, measurement data may also be understood as measurement data packet.

Figure 6:
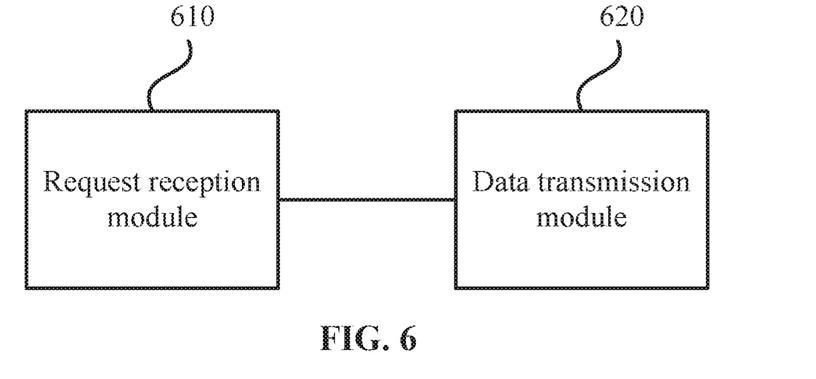
FIG. 6 is another structural diagram of a data testing device provided by an embodiment of the present disclosure.

In an embodiment, the present disclosure provides a data testing device. As shown in FIG. 6, the data testing device includes a request reception module 610 and a data transmission module 620.

The request reception module 610 is configured to receive a measurement data download request, and acquire measurement data to be downloaded corresponding to the measurement data download request.

The data transmission module 620 is configured to determine a transmission state of the measurement data to be downloaded according to a type of the measurement data to be downloaded or bandwidth occupancy of a current communication network, and issue the measurement data to be downloaded according to the transmission state.

In an embodiment, the present disclosure provides a computer readable storage medium. Computer programs are stored in the computer readable storage medium. The computer programs, when executed by a processor, implement the method for constructing mobile electric energy interconnection and the data testing method described above.

The present disclosure provides a system for constructing mobile electric energy interconnection. The system includes at least one mobile electric energy exchange device, a mobile electric energy interconnection management platform and at least one stationary electric energy interconnection device. In the present disclosure, the at least one mobile electric energy exchange device provides a real time position, a first available output electric energy and a first available input electric energy to the mobile electric energy interconnection management platform. The at least one stationary electric energy interconnection device provides a working position, a second available output electric energy and a second available input electric energy to the mobile electric energy interconnection management platform. The mobile electric energy interconnection management platform matches the at least one mobile electric energy exchange device with the at least one stationary electric energy interconnection device, and pushes a matching result to the at least one mobile electric energy exchange device and the at least one stationary electric energy interconnection device. The at least one mobile electric energy exchange device and the at least one stationary electric energy interconnection device realize the electric energy interconnection.

In an embodiment, the mobile electric energy exchange device provides the real time position, the first available output electric energy and the first available input electric energy to the mobile electric energy interconnection management platform. The real time position is generated by a mobile location management module. Both of the first available output electric energy and the first available input electric energy include at least four parameters of voltage, current, power and frequency. Upon reception of above information, the mobile electric energy interconnection management platform generates a first adaptor according to the electrical energy information category of the mobile electric energy exchange device.

The stationary electric energy interconnection device provides the working position, the second available output electric energy and the second available input electric energy to the mobile electric energy interconnection management platform. The working position is generated by a working position management module. Both of the second available output electric energy and the second available input electric energy include at least four parameters of voltage, current, power and frequency. Upon reception of the above information, the mobile electric energy interconnection management platform generates a second adaptor according to the electrical energy information category of the mobile electric energy exchange device.

The mobile electric energy interconnection management platform matches the mobile electric energy exchange device with the stationary electric energy interconnection device, and pushes a matching result to the mobile electric energy exchange device and the a stationary electric energy interconnection device. In an embodiment of the present disclosure, the mobile electric energy interconnection management platform firstly matches the mobile electric energy exchange device with the stationary electric energy interconnection device in the same location according to physical location information. Then, the mobile electric energy interconnection management platform matches the mobile electric energy exchange device with the stationary electric energy interconnection device in distance, generates a dispatch instruction of the mobile electric energy exchange device through synthetic consideration of distance and a road condition, and finally pushes a matching result to the mobile electric energy exchange device and the stationary electric energy interconnection device.

The mobile electric energy exchange device and the stationary electric energy interconnection device realize electric energy interconnection. The mobile electric energy interconnection management platform expense management module calculates a price of electric energy according to time, location and electric quantity. The mobile electric energy interconnection management platform expense management module provides a billing service to the at least one mobile electric energy exchange device and the at least one stationary electric energy interconnection device.

On the basis of any one of the above embodiments, the mobile electric energy interconnection management platform realizes effective operation of issue, matching, valuation, charge, etc. for mobile electric energy, and mobile electric energy operation service management.

On the basis of any one of the above embodiments, the mobile electric energy exchange device is loaded on mobile electric energy storage equipment. For example, the mobile electric energy storage equipment is an electric vehicle.

On the basis of any one of the above embodiments, the stationary electric energy interconnection device is loaded on power electronic equipment. For example, the power electronic equipment is a reconfigurable battery system, an energy router, or an integrated energy building.

On the basis of any one of the above embodiments, the mobile electric energy interconnection management platform is loaded on central equipment. The central equipment may be a server or a personal computer.

Figure 7:
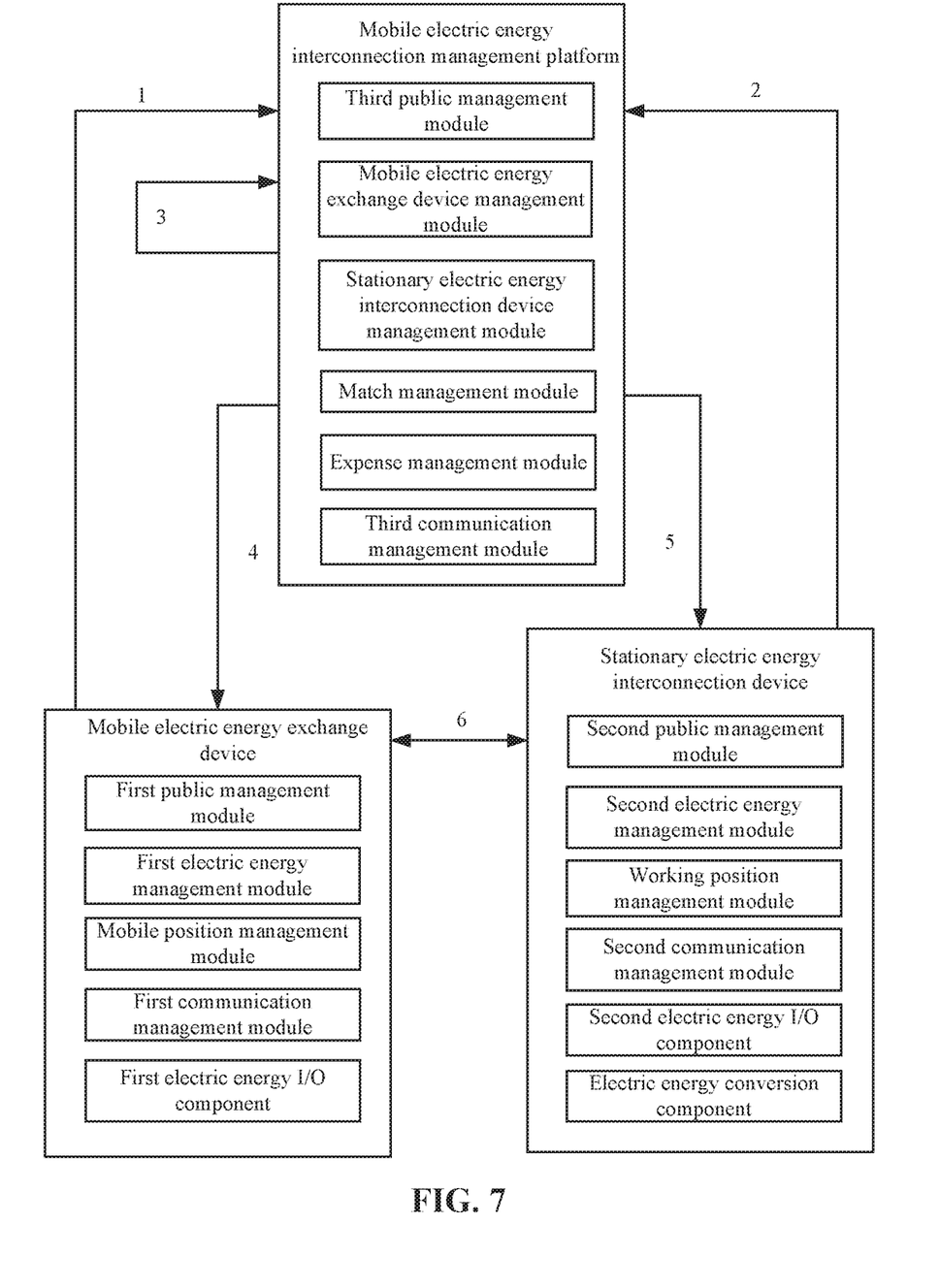
FIG. 7 is a schematic diagram of an example provided by an embodiment of the present disclosure.

The present disclosure also provides an example. As shown in FIG. 7, the mobile electric energy exchange device is an electric vehicle, and the stationary electric energy interconnection device is an energy router deployed in a power distribution room of a building.

In step 1, the mobile electric energy exchange device provides a real time position, a first available output electric energy and a first available input electric energy to the mobile electric energy interconnection management platform. For example, an electric vehicle with a license plate number "贛 A98873" is located on the Aixi Lake Bridge, which is 3 kilometers away from China energy conservation international center. The battery level of the electric vehicle is in the state of 90%, i.e., the first available input electric energy is 10% of the battery capacity and the first available output electric energy is 90% of the battery capacity. At this time, the electric vehicle sends the real time position, the first available output electric energy and the first available input electric energy to a mobile electric energy interconnection management platform. The electric vehicle with license plate number "贛 A98873" is capable of reversely charging the power grid.

The mobile electric energy interconnection management platform updates information of electric energy interconnection received from the electric vehicle with license plate number "贛 A98873".

In step 2, the stationary electric energy interconnection device provides a working position, a second available output electric energy and a second available input electric energy to the mobile electric energy interconnection management platform. For example, stationary electric energy interconnection device numbered EI096 and deployed in a power distribution room of China energy conservation international center determines that machine room 1 has a power cut, the battery capacity of Uninterrupted Power Supply (UPS) of the machine room 1 only lasts 2 hours, and the power supply of the machine room 1 may be restored in 3 hours. This stationary electric energy interconnection device lacks power supply for 1 hour and cannot provide output electric energy. At this time, the stationary electric energy interconnection device numbered EI096 sends the working position, the second available output electric energy and the second available input electric energy to the mobile electric energy interconnection management platform. The stationary electric energy interconnection device numbered EI096 is capable of receiving reverse charge from the electric vehicle and performing electric energy conversion from a direct current into an alternating current.

The mobile electric energy interconnection management platform updates information received from the stationary electric energy interconnection device numbered EI096.

In step 3, the mobile electric energy interconnection management platform matches the mobile electric energy exchange device with the stationary electric energy interconnection device, and pushes a matching result to the mobile electric energy exchange device and the stationary electric energy interconnection device. For example, a mobile electric energy interconnection management platform determines the mobile electric energy exchange device getting to the stationary electric energy interconnection device with shortest time is the electric vehicle with license plate number "贛 A98873" according to a road condition, weather and traffic control information. If the mobile electric energy interconnection management platform determines that the available battery capacity of the electric vehicle with license plate number "贛 A98873" cannot satisfy the electricity requirement of the machine room 1, the mobile electric energy interconnection management platform immediately informs other available electric vehicles or other emergency power vehicles.

In step 4, the mobile electric energy interconnection management platform issues a dispatch instruction to the mobile electric energy exchange device. For example, after receiving a dispatch instruction with the content of "immediately go to the power distribution room of China energy conservation international center and provide electric energy to the stationary electric energy interconnection device numbered EI096 on arrival", the electric vehicle will go to China energy conservation international center.

In step 5, the mobile electric energy interconnection management platform sends a matching result to the stationary electric energy interconnection device. For example, the stationary electric energy interconnection device numbered EI096 receives a matching result with the content of "the electric vehicle with license plate number "贛 A98873" is expected to arrive at the power distribution room of China energy saving international center in 15 minutes and provide electric energy to the stationary electric energy interconnection device numbered EI096.

In step 6, the mobile electric energy exchange device and the stationary electric energy interconnection device realize the electric energy interconnection.

The mobile electric energy interconnection management platform performs a billing operation on the basis of the exchanged electric energy, electricity price at the moment, a traveled distance and time of the electric vehicle.

As can be seen from the above examples, as long as the stationary electric energy interconnection device numbered EI096 (which is capable of receiving reverse charge of the electric vehicle and performing electric energy conversion from the direct current into the alternating current) is deployed in the power distribution room of China energy conservation international center, through using the mobile electric energy interconnection management platform provided by the present disclosure, the electric vehicle with license plate number "赣 A98873", which is capable of reversely charge the power grid, may be used as emergency power supply for the China energy conservation international center. In conclusion, the present disclosure provides a system and method for constructing mobile electric energy interconnection, which is helpful to realize the commercialization of energy interconnection.

The present disclosure also provides a storage medium containing computer executable instructions. When executed by a processor of a computer, the computer executable instructions are used for executing the method described in any one of the above embodiments.

The storage medium may be any type of memory device or storage device. The term "storage medium" is intended to include installation medium, such as Compact Disc Read-Only Memory (CD-ROM), floppy disk or tape device; computer system memory or random access memory, such as Dynamic Random Access Memory (DRAM), Double Data Rate Random Access Memory (DDR RAM), Static Random-Access Memory (SRAM), Extended Data Output Random Access Memory (EDO RAM), Rambus Random Access Memory (Rambus RAM), etc.; nonvolatile memory, such as flash memory, magnetic medium (such as hard disk or optical storage); register or other similar types of memory element, etc. The storage medium may also include other types of storage or combinations thereof. In addition, the storage medium may be located in the first computer system in which programs are executed, or the storage medium may be located in a second computer system different from the first computer system. The second computer system is connected with the first computer system through a network (such as the Internet). The second computer system may provide program instructions to the first computer to execute. The term "storage medium" may include two or more storage media that may reside in different locations, such as in different computer systems connected through a network. The storage medium may store program instructions (such as computer programs) that may be executed by one or more processors.

Of course, the computer readable storage medium containing computer executable instructions provided by an embodiment of the present disclosure, its computer executable instructions are not limited to the above mentioned method for constructing mobile electric energy interconnection and data testing method, may also perform relevant operation of method for constructing mobile electric energy interconnection and data testing method provided by any embodiment of the present disclosure.

For the aforesaid embodiment, method for constructing mobile electric energy interconnection and data testing method are described to a series of combination of actions for the purpose of simple description. However, it should be known by those skilled in the art that the present disclosure is not limited by the sequence of actions described, because some steps may be performed in other sequences or simultaneously according to the present disclosure. The words "first", "second" etc. in the above embodiments are only used to distinguish features, not to define features.

The arithmetic and display provided by the present disclosure are not inherently relevant to any particular computer, virtual system, or other device. One or more general-purpose systems may also be used in conjunction with the embodiments based the present disclosure. It may be understood by those skilled in the art that the modules of device in an embodiment may be configured in one or more devices different from the embodiment. It may be understood by those skilled in the art that modules, units or components in an embodiment may be combined into one module, unit or element, and may be further divided into multiple sub-modules, sub-units or sub-components. Except that at least some of such features and/or processes or units are mutually exclusive, any combination may be used to combine all features and all processes of the disclosed method, or units of device in the specification which includes claims, abstract and drawings.

An embodiment of the present disclosure may be implemented by hardware, or by software modules running on one or more processors, or their combination. It may be understood by those skilled in the art that a microprocessor or Digital Signal Processing (DSP) may be used in practice to realize some or all functions of some or all components of the devices provided by the embodiment of the present disclosure. The present disclosure may also be part or all devices, or programs in device (such as a computer program and a computer program product) of using to implement some or all of the methods described here. Such programs realized the present disclosure may be stored in computer readable medium, or may take the form of one or more signals. Such signals may be downloaded from the Internet sites, or provided on carrier signals, or provided by any other forms.

The above embodiments describe rather than restrict the present disclosure. The present disclosure may be implemented with hardware including multiple different components and with appropriately programmed computers.

What is claimed is:

1. A system for constructing mobile electric energy interconnection, comprising: at least one mobile electric energy exchange device, a mobile electric energy interconnection management platform and at least one stationary electric energy interconnection device;

wherein the at least one mobile electric energy exchange device and the at least one stationary electric energy interconnection device both are in communication connection with the mobile electric energy interconnection management platform;

the at least one mobile electric energy exchange device is configured to provide a real time position, a first available output electric energy and a first available input electric energy to the mobile electric energy interconnection management platform;

the at least one stationary electric energy interconnection device is configured to provide a working position, a second available output electric energy and a second available input electric energy to the mobile electric energy interconnection management platform;

the mobile electric energy interconnection management platform is configured to match the at least one mobile electric energy exchange device with the at least one stationary electric energy interconnection device according to the real time position, the first available output electric energy and the first available input electric energy received from the at least one mobile electric energy exchange device and the working position, the second available output electric energy and the second available input electric energy received from the at least one stationary electric energy interconnection device, and push a matching result to the at least one mobile electric energy exchange device and the at least one stationary electric energy interconnection device, to enable the electric energy interconnection between the at least one mobile electric energy exchange device and the at least one stationary electric energy interconnection device;

the mobile electric energy interconnection management platform is configured to match the at least one mobile electric energy exchange device with the at least one stationary electric energy interconnection device comprises one of:

under a condition in which electricity demand of the at least one stationary electric energy interconnection device is satisfied, determining, for each of the at least one stationary electric energy interconnection device, one of the at least one mobile electric energy exchange device getting to the each of the at least one stationary electric energy interconnection device with shortest time according to a road condition, weather and traffic control information;

under a condition in which electricity demand of the at least one mobile electric energy exchange device is satisfied, determining, for each of the at least one mobile electric energy exchange device, one of the at least one stationary electric energy interconnection device taking shortest time for the each of the at least one mobile electric energy exchange device to get to according to the road condition, the weather and the traffic control information.

2. The system of claim 1, wherein the mobile electric energy exchange device comprises a first public management module, a first electric energy management module, a mobile position management module, a first communication management module and a first electric energy input/output component;

wherein the first public management module is configured to perform a software definition of the first electric energy management module, the mobile position management module and the first communication management module;

the first electric energy management module is configured to manage electric energy of the mobile electric energy exchange device;

the mobile position management module is configured to acquire the real time position of the mobile electric energy exchange device;

the first communication management module is configured to communicate with the mobile electric energy interconnection management platform;

the first electric energy input/output component is configured to input or output electric energy.

3. The system of claim 2, wherein the first electric energy management module comprises a first electric energy input sub-module, a first electric energy output sub-module, a first electric energy metering sub-module and a first electric energy billing sub-module;

wherein the first electric energy input sub-module is configured to manage the first available input electric energy of the mobile electric energy exchange device;

the first electric energy output sub-module is configured to manage the first available output electric energy of the mobile electric energy exchange device;

the first electric energy metering sub-module is configured to meter the first available input electric energy and the first available output electric energy;

the first electric energy billing sub-module is configured to provide a billing service to the mobile electric energy exchange device.

4. The system of claim 1, wherein the stationary electric energy interconnection device comprises a second public management module, a second electric energy management module, a working position management module, a second communication management module, a second electric energy input/output component and an electric energy conversion component;

wherein the second public management module is configured to perform a software definition of the second electric energy management module, the working position management module and the second communication management module;

the second electric energy management module is configured to manage electric energy of the stationary electric energy interconnection device;

the working position management module is configured to acquire a position of the stationary electric energy interconnection device;

the second communication management module is configured to communicate with the mobile electric energy interconnection management platform;

the second electric energy input/output component is configured to input or output electric energy;

the electric energy conversion component is configured to convert electric energy.

5. The system of claim 4, wherein the second electric energy management module comprises a second electric energy input sub-module, a second electric energy output sub-module, an electric energy conversion sub-module, a second electric energy metering sub-module and a second electric energy billing sub-module;

wherein the second electric energy input sub-module is configured to manage the second available input electric energy of the stationary electric energy interconnection device;

the second electric energy output sub-module is configured to manage the second available output electric energy of the stationary electric energy interconnection device;

the electric energy conversion sub-module is configured to convert the electric energy of the stationary electric energy interconnection device according to electric energy of the mobile electric energy exchange device matched with the stationary electric energy interconnection device;

the second electric energy metering sub-module is configured to meter the second available input electric energy and the second available output electric energy;

the second electric energy billing sub-module is configured to provide a billing service to the stationary electric energy interconnection device.

6. The system of claim 1, wherein the mobile electric energy interconnection management platform comprises a third public management module, a mobile electric energy exchange device management module, a stationary electric energy interconnection device management module, a match management module, an expense management module and a third communication management module;

wherein the third public management module is configured to perform a software definition of the mobile electric energy exchange device management module, the stationary electric energy interconnection device management module, the match management module, the expense management module and the third communication management module;

the mobile electric energy exchange device management module is configured to receive the real time position, the first available output electric energy and the first available input electric energy provided by the at least one mobile electric energy exchange device;

the stationary electric energy interconnection device management module is configured to receive the working position, the second available output electric energy and the second available input electric energy provided by the stationary electric energy interconnection device;

the match management module is configured to match the at least one mobile electric energy exchange device with the at least one stationary electric energy interconnection device;

the expense management module is configured to provide a billing service to the at least one mobile electric energy exchange device and the at least one stationary electric energy interconnection device;

the third communication management module is configured to push a matching result to the at least one mobile electric energy exchange device and the at least one stationary electric energy interconnection device.

7. The system of claim 1, wherein
the first available output electric energy comprises voltage, current, power and frequency of the first available output electric energy;
the first available input electric energy comprises voltage, current, power and frequency of the first available input electric energy;
the second available output electric energy comprises voltage, current, power and frequency of the second available output electric energy; and
the second available input electric energy comprises voltage, current, power and frequency of the second available input electric energy.

8. The system of claim 1, wherein
the mobile electric energy exchange device is loaded on mobile electric energy storage equipment;
the stationary electric energy interconnection device is loaded on power electronic equipment;
the mobile electric energy interconnection management platform is loaded on central equipment, wherein the central equipment is a server or a computer.

9. A method for constructing mobile electric energy interconnection, comprising:
receiving a real time position, a first available output electric energy and a first available input electric energy sent by at least one mobile electric energy exchange device;
receiving a working position, a second available output electric energy and a second available input electric energy sent by at least one stationary electric energy interconnection device; and
matching the at least one mobile electric energy exchange device with the at least one stationary electric energy interconnection device according to the real time position, the first available output electric energy and the first available input electric energy received from the at least one mobile electric energy exchange device and the working position, the second available output electric energy and the second available input electric energy received from the at least one stationary electric energy interconnection device, and pushing a matching result to the at least one mobile electric energy exchange device and the at least one stationary electric energy interconnection device, to enable the electric energy interconnection between the at least one mobile electric energy exchange device and the at least one stationary electric energy interconnection device comprises one of:

wherein matching the at least one mobile electric energy exchange device with the at least one stationary electric energy interconnection device comprises one of:

under a condition in which electricity demand of the at least one stationary electric energy interconnection device is satisfied, determining, for each of the at least one stationary electric energy interconnection device, one of the at least one mobile electric energy exchange device getting to the each of the at least one stationary electric energy interconnection device with shortest time according to a road condition, weather and traffic control information;

under a condition in which electricity demand of the at least one mobile electric energy exchange device is satisfied, determining, for each of the at least one mobile electric energy exchange device, one of the at least one stationary electric energy interconnection device taking shortest time for the each of the at least one mobile electric energy exchange device to get to according to the road condition, the weather and the traffic control information.

10. A non-transitory computer readable storage medium, wherein computer programs are stored in the computer readable storage medium, the computer programs, when executed by a processor, implement the method of claim 9.

11. A data testing method, comprising:
acquiring measurement data within a data window of a preset time period;
calculating a variance of the measurement data;
comparing the variance with a first preset threshold to obtain a comparison result; and
determining quality of the measurement data according to the comparison result.

12. The method of claim 11, wherein acquiring measurement data within the data window of the preset time period comprises:
sending a measurement data download request, and acquiring the measurement data within the data window of the preset time period.

13. The method of claim 11, wherein determining the quality of the measurement data according to the comparison result comprises:
in response to determining that the variance is greater than the first preset threshold, determining that the measurement data is high quality data; and
in response to determining that the variance is equal to or less than the first preset threshold, determining that the measurement data is suspicious data.

14. The method of claim 13, further comprising:
storing the suspicious data into a suspicious database, and testing correlation between the suspicious data and other data;
in response to determining that the correlation between the suspicious data and other data is large, determining that the suspicious data is high quality data; and in response to determining that the correlation between the suspicious data and other data is small, determining that the suspicious data is low quality data.

15. The method of claim 14, wherein testing the correlation between the suspicious data and other data comprises:
calculating a correlation coefficient between the suspicious data and other data;
comparing an absolute value of the correlation coefficient with a second preset threshold;
in response to determining that the absolute value of the correlation coefficient is equal to or greater than the second preset threshold, determining that the correlation between the suspicious data and other data is large; and
in response to determining that the absolute value of the correlation coefficient is less than the second preset threshold, determining that the correlation between the suspicious data and other data is small.

16. The method of claim 11, wherein the data window comprises at least one of:
a first electric energy management module, a mobile position management module and a first communication management module of a mobile electric energy exchange device;
a second electric energy management module, a working position management module and a second communication management module of a stationary electric energy interconnection device; or
a mobile electric energy exchange device management module, a stationary electric energy interconnection device management module, a match management module, an expense management module and a third communication management module of a mobile electric energy interconnection management platform.

17. A non-transitory computer readable storage medium, wherein computer programs are stored in the computer readable storage medium, the computer programs, when executed by a processor, implement the method of claim 11.

* * * * *